Nov. 3, 1964 W. S. KING 3,155,340
FISHING REEL MOUNT WITH LINE ANCHORING MEANS
Filed June 15, 1962 3 Sheets-Sheet 1
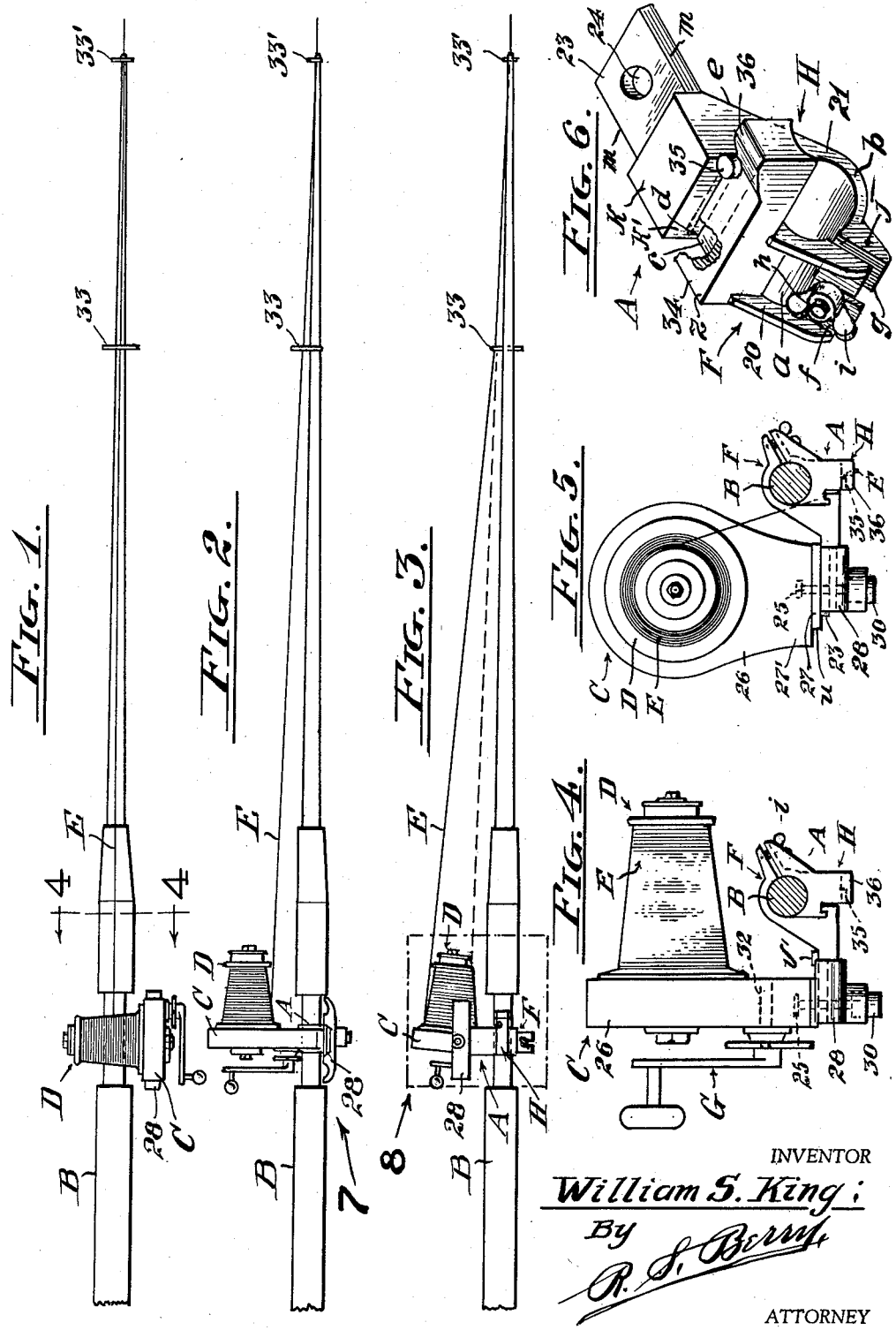
INVENTOR
William S. King;
By
R. S. Berry
ATTORNEY

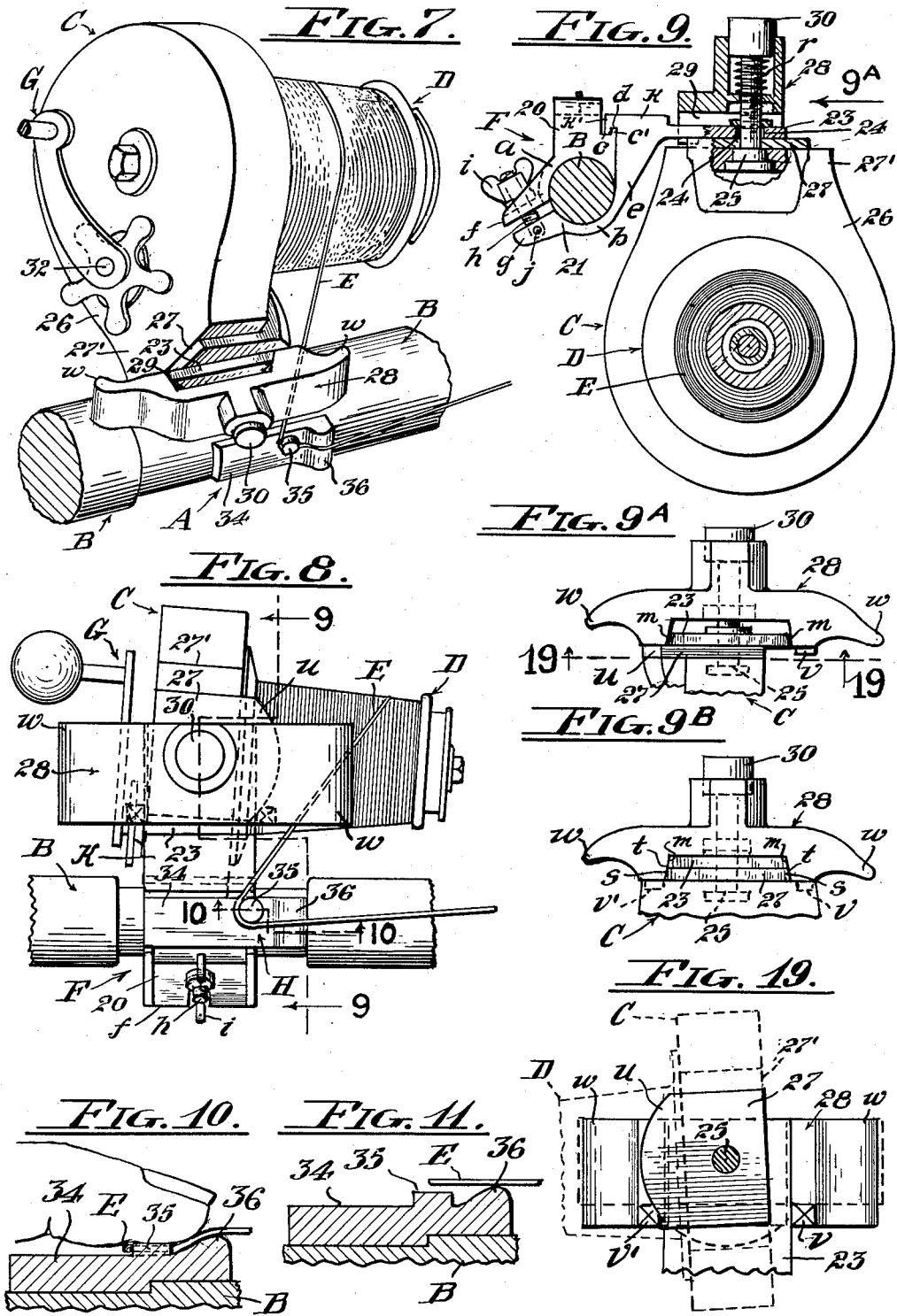

Nov. 3, 1964          W. S. KING          3,155,340
FISHING REEL MOUNT WITH LINE ANCHORING MEANS
Filed June 15, 1962                     3 Sheets-Sheet 3
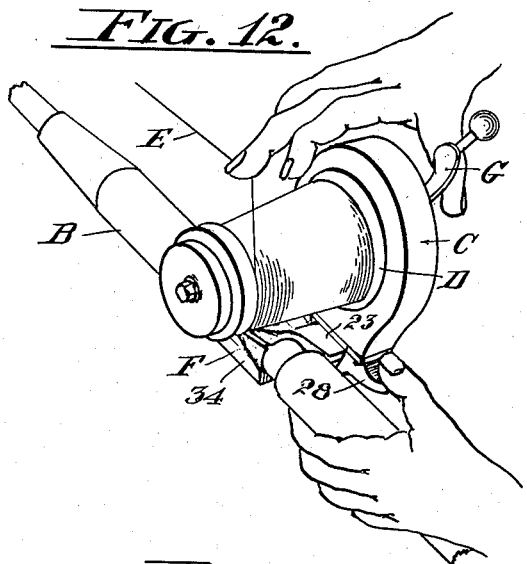
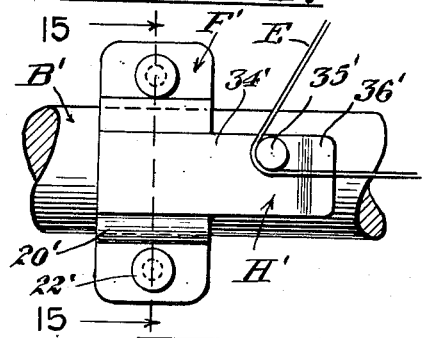
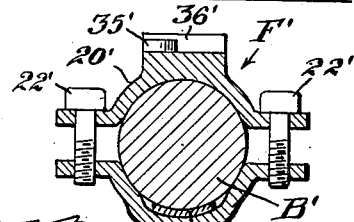
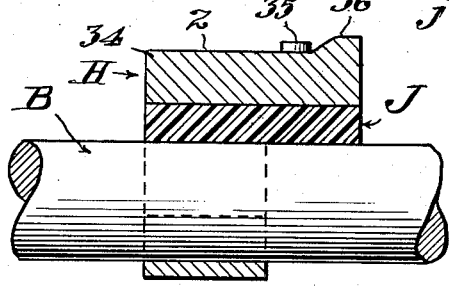
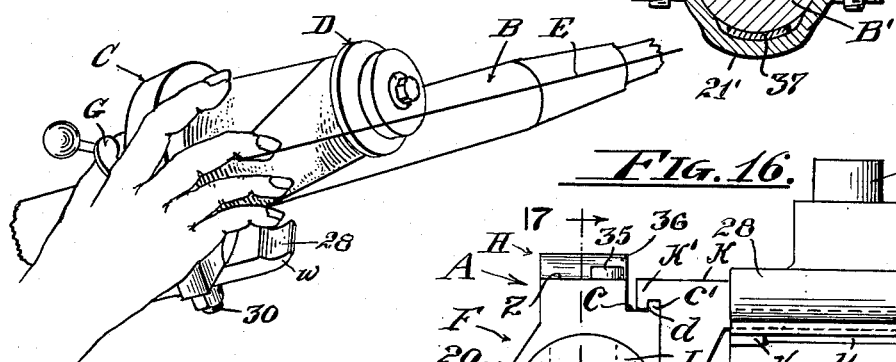
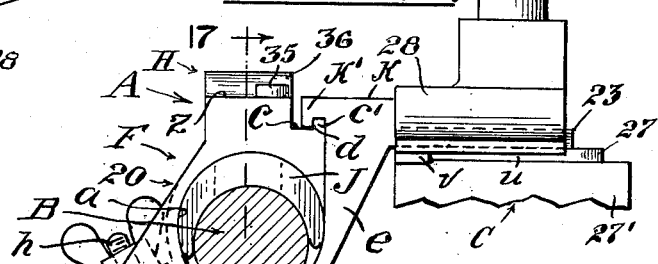
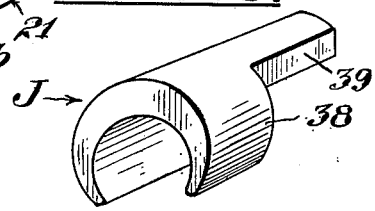
INVENTOR
William S. King
BY R. S. Berry
ATTORNEY

3,155,340
FISHING REEL MOUNT WITH LINE ANCHORING MEANS
William S. King, 6532 Day St., Tujunga, Calif.
Filed June 15, 1962, Ser. No. 202,748
7 Claims. (Cl. 242—84.2)

This invention relates to a fishing reel mount adapted to be attached to a fishing rod to afford a support for a fishing reel.

The invention particularly pertains to a mount for fishing reels of the type wherein the reel may be employed in a casting operation in which a line wound on the spool of the reel passes off the forward end of the spool, and wherein the reel may also be utilized as a conventional spool type reel in which the line is directly rewound on the spool by rotating the latter.

In fishing reels of the above character, the line bearing spool is adapted to be disposed in either of two positions relative to the rod on which it is carried, the spool being arranged with its axis extending longitudinally of the rod in effecting a casting operation, and being arranged with its axis extending transversely of the rod in effecting a line retrieving operation.

The primary object of the invention is to provide a mount for fishing reels of the above recited type, whereby, the reel is adapted to be swung laterally on a pivot the axis of which is offset in spaced but proximate transverse relation to the longitudinal axis of the rod on which the mount is carried, and wherein the spool of the reel, when disposed in the casting position, will be arranged with its longitudinal axis extending perpendicular to the pivotal axis of the reel parallel with the longitudinal axis of the rod, or substantially so, whereby in a casting operation the line unwinding from the outer end of the spool and leading through a guide ring on or adjacent the outer end of the rod will extend at such inclined or diagonal relation to the rod and spaced such distance therefrom as not to be apt to lash the rod. The general arrangement aforesaid is shown in co-pending applications Serial Numbers 52,658 and 70,725 filed by me respectively August 29, 1960, and November 21, 1960, of which the application Serial Number 52,658 has resulted in Patent Number 3,053,469, and the application Serial Number 70,725 has been abandoned and an application Serial Number 274,495 filed April 22, 1963, in substitution therefor.

Another object of the invention is to provide a construction in the mount whereby the line leading from the spool may be releasably anchored and held against unwinding during the casting operation and subsequently released under the control of the operator when deemed advisable, whereby the stress ordinarily imposed by the line on a finger of the operator when casting will be eliminated.

Another object is to embody in the mount a rod engaging clamp having a pair of separable sections wherein one of the sections carries the line anchoring element in a position convenient to the reach of the thumb of the operators hand grasping the rod when the rod is disposed with the reel thereon in the casting position.

Another object is to provide a construction in the reel mount whereby the crank operated drive shaft of the reel thereon will be disposed, when the reel is in its rewinding position, proximate and in lateral relation to the rod on which the mount is carried, whereby the stress developed by rotating the crank tending to twist the rod in the hands of the operator will be minimized.

A further object is to provide the mount with a means of attachment to a fishing rod whereby the mount may be readily applied to and removed from a rod, and also to provide an adaptor whereby the mount may be attached to rods of various diameters.

With the foregoing objects and advantages in view together with such other objects and advantages as may subsequently appear, the invention resides in the parts and in the combination, construction and arrangement of parts hereinafter described and claimed and illustrated by way of example in the accompanying drawings in which:

FIG. 1 is a plan view of a fishing rod and reel equipped with the invention, showing the reel in its line retrieving position in which the reel spool is disposed with its longitudinal axis extending transversely of the rod;

FIG. 2 is a plan view showing the rod as turned on its axis ninety degrees to the left relative to the position shown in FIG. 1 preparatory to disposing it in its casting position; the spool being then arranged with its longitudinal axis extending lengthwise of the rod;

FIG. 3 is a plan view showing the fishing rod and reel disposed in the casting position; the rod being turned a half revolution from the position shown in FIG. 1 thus inverting the rod relative to the position shown in FIG. 1 and disposing the reel and spool in dependent and laterally offset relation to the rod, when the latter is in a horizontal or near horizontal position;

FIG. 4 is an enlarged view in section and elevation as seen on the line 4—4 of FIG. 1 in the direction indicated by the arrows showing the reel spool in the line retrieving position;

FIG. 5 is a view in section and elevation similar to FIG. 4 showing the reel as initially turned to dispose it intermediate the line retrieving and casting positions and in readiness for disposing the reel and spool in the line casting position effected by turning the rod a half revolution from the position shown in FIG. 1:

FIG. 6 is an isometric view of the reel mount showing it detached from the rod and reel:

FIG. 7 is a prespective view depicting the assemblage of fishing rod, reel mount and reel as seen from beneath the rod substantially in the direction of the arrow 7 in FIG. 2:

FIG. 8 is an enlarged plan view of the assemblage depicted in the broken line rectangle 8 of FIG. 3 showing the parts in the line casting position:

FIG. 9 is a view in section and elevation as seen on the line 9—9 of FIG. 8 in the direction indicated by the arrows and showing the parts as disposed in the line casting position:

FIG. 9A is a detail in elevation partly in section as seen in the direction indicated by the arrow 9A of FIG. 9:

FIG. 9B is a detail similar to FIG. 9A showing the parts as disposed in the line retrieving position wherein the reel is releasably locked against turning relative to the mount:

FIG. 10 is a detail in section taken on the line 10—10 of FIG. 8 with parts removed, showing the manner of releasably anchoring the line in a casting operation and depicting the line releasably held in place by the thumb of the operator:

FIG. 11 is a view similar to FIG. 10 showing the manner of automatically freeing the line from its anchored condition on removal of the operator's thumb from engagement therewith:

FIG. 12 is a perspective view of the reel mount and rod assembly showing the reel in the retrieving position and depicting the manner of grasping the assembly preliminary to turning the reel to the casting position:

FIG. 13 is a perspective view of the reel as disposed in its casting position and depicting the manner in which the operator retrieves the line preliminary to disposing it in its anchored condition, shown in FIGS. 8 and 10:

FIG. 14 is a plan view of the line anchor as applied to the rod engaging clamp of the mount of a conventional spin casting reel:

FIG. 15 is a view in cross section and elevation taken on the line 15—15 of FIG. 14 as seen in the direction indicated by the arrows:

FIG. 16 is a view in cross section of the reel mount showing it as equipped with an adaptor whereby the mount may be applied to fishing rods of various diameters:

FIG. 17 is a longitudinal sectional view as seen on the line 17—17 of FIG. 16 with portions shown in elevation:

FIG. 18 is a perspective view of an adaptor employed in the construction shown in FIGS. 16 and 17, and FIG. 19 (sheet 2) is an inverted plan view and section as seen on the line 19—19 of FIG. 9A.

Referring to the drawings more specifically A indicates generally the reel mount embodying the invention, B designates a fishing rod on which the mount A is carried, and C denotes a fishing reel carried on the mount A. The reel C embodies a revoluble spool D on which is wound a length of fish line E. The mount A, particularly shown in FIG. 6, embodies means whereby it may be rigidly secured to the rod B here shown as comprising a clamp F consisting of a pair of separable rod engaging sections 20–21 adapted to be positioned astride the rod B and clamped in fixed engagement therewith.

The clamp sections 20–21 embody arcuate portions $a$–$b$, respectively, adapted to collectively encompass the rod. One end of the portion $a$ terminates in a shoulder $c$ having thereon a rib $c'$ which rib, in assembling the sections 20–21, is positioned in interlocking engagement with the side walls of a channel $d$ on an extension $e$ of one end of the arcuate portion $b$ of the section 21, the outer end of the extension $e$ terminating in a head $k$ having a marginal flange $k'$ on the under side of which extends the channel $d$, as particularly shown in FIG. 16. The other ends of the arcuate portions $a$–$b$ terminate in opposed overlying flanges $f$–$g$ respectively, which flanges extend in spaced parallel relation to each other and are interconnected by an assemblage comprising a threaded stem $h$ and wing-nut $i$ arranged with one end of the stem $h$ extending into an open ended slot in the flange $g$ and pivotally connected to the later by a pivot $j$ to swing in and out of an open ended slot in the flange $f$; the wing-nut $i$ being screwed on the outer end portion of the stem $h$ for abutting engagement with the flange $f$ whereby the arcuate portions $a$–$b$ of the clamp sections 20–21 may be drawn toward each other in effecting clamping engagement of the mount A with the rod B.

Mounted on the extension $e$ is an element adapted to afford a pivotal seat for the fishing reel C, which element is here shown as comprising a rectangular flat sided reel supporting plate 23 projecting from the outer side of the head $k$ opposite the flange $k'$ integral therewith. The plate 23 has parallel side margins $m$—$m$ and is provided with a central annular aperture 24 which latter serves as a bearing for a pivot pin 25 on the reel C. The extension $e$ constitutes a bracket the outer face of which projects obliquely outward with respect to the jaw 21 and terminates in spaced off-set relation to the clamp F. One of the flat sides of the plate 23, constituting a seating surface of the reel C, leads from the outer end of the outer face of the bracket extension $e$ in obtuse angular relation thereto. The aperture 24 constitutes a means for supporting the pivot pin 25 in perpendicular relation to the seating surface of the plate 23. The aforesaid positioning of the plate 23 affords a support for the reel whereby the spool D is disposed close to the rod B as later described.

The reel C embodies a housing 26 having a flat faced bearing plate 27 fixed on its base end portion 27' which bearing plate, when the reel is assembled on the mount A, slidably seats against one of the flat sides of the plate 23. The pivot pin 25 is fixed at one end thereof to the end portion 27' of the reel and freely extends through the aperture 24 in circumferential slidable contact with the portion of the plate 23 bordering said aperture whereby the reel is adapted to be turned laterally relative to the plate 23.

Slidably mounted on the outer end portion of the pivot pin 25 is an elongated reel locking bar 28 which extends transversely of and adjacent to the reel supporting plate 23 and has the face thereof presented to the plate 23 provided with a channel 29 into which the plate 23 normally projects by virtue of a thrust spring $r$ wound around the pivot pin 25 bearing between the bar 28 and a thumb rest button 30 fixed on the outer end of the pivot pin as shown in FIG. 9.

The spring $r$ exerts opposed thrusts on the pivot pin 25 and the bar 28 which, by reason of the pin being affixed to the reel base and the bar 28 being loose on the pin 25, acts to urge the reel base plate 27 and bar 28 against opposite sides of the plate 23 as shown in FIG. 9B. When the parts are thus disposed, which occurs when the reel is in the line retrieving position, that is with the spool D extending transversely of the rod B, the reel is locked against turning movement on the pivot pin 25 by reason of the side margins of the plate 23 and the contiguous side margins of the base plate 27 being in abutting relation to the wall portions of the bar 28 bordering the channel 29.

In order to insure against unwanted loose movement of the reel relative to its supporting plate 23 when in its seated position shown in FIG. 9B, the side margins $m$—$m$ of the plate 23, the side margins $s$—$s$ of the plate 23 and the adjacent side walls $t$—$t$ of the channel 29 are correspondingly beveled so that the margins $m$—$m$ and $s$—$s$ will snugly seat on the side walls $t$—$t$ when the bar 28 is in its reel locking position. This feature is important since a slight turning movement of the reel occasioned by looseness in its pivotal support on the mount, as would be produced by clearance between the margins $m$—$m$ and $s$—$s$ and side walls $t$—$t$ would be reflected by a greatly amplified relative movement of the outer portion of the reel with resultant objectionable swinging movement of the spool D. The opposed end portions of the locking bar 28 project a short distance from the side margins $s$—$s$ of the plate 23 to afford finger-holds $w$—$w$ whereby the bar 28 may be manually manipulated to shift it longitudinally of the pivot pin in opposition to the spring $r$ in freeing the reel from engagement with the locking bar preparatory to turning the reel to its casting position.

In actuating the locking bar 28 to release the reel for turning movement relative to the supporting plate 23, the bar 28 is moved a distance longitudinally of the pivot pin 25 from the position shown in FIG. 9B such as to free the base plate 27 as indicated in FIG. 9A, whereupon the reel may be turned on its pivotal mounting from its line retrieving to its line casting position. As a means for holding the locking bar 28 in its retracted reel releasing position, shown in FIG. 9A, the base plate 27 is provided with a lateral extension $u$ which on turning the reel from its line retrieving position will slidably over-ride the underside of the locking bar, as shown in FIGS. 9A and 19, thereby supporting the locking bar in its retracted position in opposition to the spring $r$ while the reel is disposed out of its line retrieving position. As a means for limiting turning movement of the reel in either direction, a pair of stops $v$–$v'$ are provided on the underside of the locking bar 28 as shown in FIG. 19; the stop $v$ affording an abutment for marginal portion of the base plate 27 to align the latter for engagement in the channel 29 when the reel is turned to its line retrieving position, and the stop $v'$ affording an abutment for another marginal portion of the base plate 27 to limit turning movement of the reel to its line casting position as shown in FIG. 19.

The reel C embodies within the housing 26 thereof crank operated mechanism, not shown, for driving the spool D in the line retrieving operation. Such mechanism constitutes no part of the present invention. It may be of conventional construction or that set forth in the pending applications aforesaid.

A hand crank G is provided in a usual manner for operating the spool rotating mechanism, which crank is connected to a drive shaft 32 entering the housing 26 adjacent the base 27' of the reel, which shaft is adapted to actuate the spool rotating mechanism, not shown, in a usual manner.

By the aforesaid construction of the mount A, the extension e of the clamp section 21 leads away from the rod B to which the mount is applied such distance that the head k on the outer end of the extension will be spaced in diagonal relation to the rod, and whereby the reel supporting plate 23 projecting laterally from the head k will lead outwardly from the rod so that the reel C seated thereon will be disposed with its axis laterally offset relative to the axis of the rod in perpendicular relation thereto.

The reel mount A is thus characterized by affording a pivotal support for the reel C wherein such support is so located that when the rod B is in a horizontal position and the reel is in its casting position as shown in FIG. 9, the axis of the reel, namely the pivot pin 25, will extend in perpendicular relation to the axis of the rod and in laterally spaced relation thereto, and wherein the line spool on the reel will extend perpendicular to the axis of the reel on a plane spaced below the rod, whereby the line leading from the spool to a guide ring 33 adjacent the outer end of the rod will extend beneath and in such diagonally spaced relation to the rod as not to impact or whip the rod during a casting operation.

In further carrying out the invention, the inner end of the arcuate portion a of the clamp section 20 is fitted with a line anchoring element H embodying an elongated base plate 34 preferably integral with the section 20, which plate has an end portion projecting in overlying parallel relation to the rod engaged by the clamp F and in parallel relation to the locking bar 28; the base plate 34 being arranged adjacent the head k with its top face z lying on a plane at least approximating that of the top face of the head k.

Projecting from the top face z of the plate 34 is an immovably fixed line anchoring stud 35 having a height slightly more than the thickness of the line E which is to be looped around the stud 35 and held in place by the thumb of the operator as shown in FIG. 10 and as will presently be described; the line being designated to be temporarily extended from the spool D and passed around the stud 35 and then led longitudinally of the rod B through guide rings 33–33' on the outer end portion of the latter.

As a means for insuring disengagement of the line from the stud 35 on removal of the thumb of the operator from the stud to free the line, the outer end of the plate 34 is provided with a transverse bridge 36 which projects from the face z of the plate 34 a distance exceeding the projection of the stud 35 so that the outer margin of the bridge 36 will lie on a plane spaced slightly outward from the plane of the outer end of the stud 35. The line E passing from the stud 35 extends over the bridge 36 in contact therewith such that a pull on the outer portion of the line will cause the bridge 36 to elevate the portion of the line passed around the stud 35 and thereby free the line from its anchored engagement with the stud, on release of the line by the operator, as shown in FIG. 11.

The clamp F serves the purpose of attaching the reel supporting portion of the mount A and line anchoring element H to the rod B collectively. The line anchoring element H is applicable for use in conjunction with fishing reel mounts of types other than above described, as illustrated for example in FIGS. 14 and 15 where the element indicated generally at H' comprises an elongated plate 34' carrying a lug 35' and flange 36' complementary to the plate 34, lug 35 and flange 36 above described.

In this instance the plate 34' is fixed on one of the members 20' of a conventional two piece clamp F' to project longitudinally of a rod B' to which the clamp F' is attached. The other member 21' of the clamp is designed to engage the usual fishing reel wing 37 interposed between the clamp member 21' and the rod B', whereupon the clamp members 20'—21' are drawn toward each other on opposite sides of the rod in clamping engagement with the rod by screws 22' in a conventional fashion, as shown in FIG. 15.

Where the reel mount A is to be attached to a rod B of smaller diameter than that of the interior of the combined arcuate portions a–b of the clamp sections 20–21, the difference in such diameter may be compensated for by the employment of an adaptor J shown in FIG. 18, which adaptor is applied between the clamp F and rod B as shown in FIGS. 16–17. The adaptor J comprises a body portion 38 of crescent shaped cross section dimensioned to occupy the gap between the rod B and clamp F. Such body portion is adapted to be sprung astride the rod and for which purpose is flexible, being preferably formed of a suitable plastic material having requisite flexibility. The body portion 38 has a lateral projection 39 on its enlarged portion which is adapted to underlie the extended end portion of the plate 34 and to fill the gap between the rod B and such portion, as shown in FIG. 17.

Assuming the fishing rod B as held in the hands of a fisherman with the rod extended horizontally, or nearly so, and the reel C disposed at the completion of a line retrieving operation with the spool D extending transversely across the rod as shown in FIGS. 1, 4 and 12, the operation of placing the reel and rod in readiness for casting, is as follows:

First, the locking bar 28 is depressed to release the then locked reel; it being pushed down and held in opposition to the spring r by the thumb of the left hand while the reel is grasped at the upper end thereof in the right hand, as indicated in FIG. 12.

The reel is then turned laterally on its mounting to present the free end of the spool D toward the outer end of the rod as indicated in FIGS. 2 and 5, the extension u on the base plate 27 then moving over the adjacent side of the locking bar 28 immediately on the base plate 27 being advanced out of alignment with the sides of the channel 29 thereby holding the locking bar in its reel release position so that the operator's thumb may then be lifted free of the bar which, under the urge of the spring r, will be advanced into sliding contact with the adjacent face of the base plate 27. The reel is thus turned until a marginal portion of the base plate 27 abuts the stop v' as shown in FIG. 19, whereupon the reel comes to rest with the free end of the spool D presented toward the outer end of the rod B. The reel will then be retained in this position under frictional engagement of the base plate 27 and locking bar 28 which latter then acts as a friction brake under the urge of the spring r to hold the reel against free turning movement away from the stop v'.

During the above recited preliminary operation, the line E may be engaged by a finger of the right hand coincident with initial grasping of the reel, as shown in FIG. 12, whereby, on laterally swinging the reel as above described, the line E will be looped around the finger as indicated in FIG. 13. The spool D will then be held against turning by engagement of its operating crank G by the thumb of the right hand, as shown in FIG. 13. The foregoing operations are effected while the reel C projects upwardly relative to the horizontally extending rod B and in a position wherein the spool D extends on a plane above the rod as depicted in FIGS. 2 and 5.

When it is desired to dispose the assembly in readiness for a casting operation, the rod B is turned on its longitudinal axis a half revolution from the position shown in FIGS. 1 and 5 to the position shown in FIGS. 8 and 9, thus inverting the reel and disposing it in a dependent position in which it projects downwardly from the supporting plate 23 with the spool D spaced below and to one side of the rod. During this turning of the rod B, the portion of line E is engaged by the finger as shown in FIG. 13, is drawn between the locking bar 28 and the rod B and looped around the stud 35 and extended over the bridge 36 as shown in FIGS. 7 and 8, whereupon the thumb of the right hand is seated on the stud and on the portion of the line E overlying the bridge 36, as shown in FIG. 10.

The stud 35 and bridge 36 will then be upwardly presented while the guide rings 33–33' on the outer end portion of the rod will be downwardly presented so that the length of the line E leading from the bridge 36 to the guide ring 33 will extend on a partial spiral along the rod contiguous the surface thereof, and will be anchored on the stud 35 under pressure of the fisherman's thumb so as to prevent free unwinding of the line from the spool and to impose upon the stud the initial stress imparted to the line in making a cast instead of upon a finger or hand of the fisherman employed in holding the line at the commencement of a cast as commonly practiced.

When making a cast with the line anchored on the stud 35, the fisherman swings the rod so that its outer end traverses an arc during which travel the weighted outer end of the line under the urge of centrifugal force exerts an increasing pull on the line which, as above stated is initially imposed on the stud 35, but when the cast approaches or reaches the end of the throw, the fisherman removes his thumb from the stud and bridge thereby freeing the line so that the pull thereon will draw taut the portion of the line leading from the stud to the bridge thereby elevating the portion of the line looped around the stud such as to free the line from engagement with the stud. Continued pull on the line will cause it to unwind from the free end of the spool which is then held against rotation in the usual manner.

A important feature of the invention attained by the recited construction of the reel mount A and the arrangement of the reel and spool thereon, is the location of the free outer end of the spool at a point spaced diagonally downward and outward relative to the rod which extends horizontally or at an inclination to the horizontal on completion of the cast. By this arrangement the line feeding from the spool leads diagonally upward and inward to the guide ring 33 in such spaced relation to the rod as not to be apt to objectionably whip-lash the rod during the casting operation or a subsequent trolling operation, or when hauled by a running fish.

The line E when unwinding from the spool imparts an outward pull longitudinally of the spool tending to turn the reel on its pivot, which pull is sufficient to hold the base plate 27 of the reel snugly against the stop v' as indicated in full lines in FIG. 19, thereby stabilizing the reel in its casting position.

Feeding of the line from the spool endwise thereof is facilitated by the tapered formation of the spool whereby the outer free end of the spool is of lesser diameter than the inner end thereof such that the body of line wound on the spool will be tapered with adjacent convolutions of the line increasing progressively in diameter from the outer to the inner ends of the pool. By this arrangement, obstruction to the unwinding of a convolution of the line ordinarily afforded by the continguous outer convolution, is eliminated or at least minimized.

The reel being freely turnable on the mount A when in the casting position, except as to the limitations of such turning movement imposed by the stops v—v', transportation of the reel from its casting position to its locked line retrieving position is readily effected by turning the rod a half revolution to dispose the reel in an upwardly extending position, then grasping the reel and turning it a quarter revolution in the direction in which the marginal portion of the base plate 27 abutting the stop v' moves away from the latter, namely, counter-clockwise in the arrangement shown. On thus turning the reel, another marginal portion of the base plate 27 moves against the stop v thereby aligning the beveled margins s—s of the base plate with the side walls t—t of the channel 29 whereupon the locking bar 28 is advanced by the spring r into its engagement with the base plate 27 thereby locking the reel against movement relative to the mount A and thus holding the reel in its line retrieving position.

I claim:
1. In a fishing reel mount,
 (a) a clamp adapted to be applied to a fishing rod in gripping engagement therewith,
 (b) a base plate attached to said clamp, and
 (c) a line engaging stud immovably fixed on said base plate adapted to temporarily anchor a line passed therearound,
 (d) said stud projecting from said plate a distance approximating the thickness of the line engaged thereby with its outer end adapted to be abutted by the thumb of an operator,
 and means for automatically elevating the line free of said stud on a pull being imparted to the line.
2. In a fishing reel mount,
 (a) a clamp adapted to be applied to a fishing rod in gripping engagement therewith,
 (b) a base plate attached to said clamp,
 (c) a line engaging stud on said base plate adapted to temporarily anchor a line passed therearound,
 (d) said stud projecting from said plate a distance approximating the thickness of the line engaged thereby with its outer end adapted to be abutted by the thumb of an operator, and
 (e) a bridge on said base plate adjacent said stud projecting above the outer end of the stud, said bridge being arranged to support a line leading from said stud and thereby adapted to free the line from the stud on a pull being imparted to the line across the bridge on the operator's thumb being lifted from the stud.
3. In a fishing reel and mount therefor,
 (a) a reel supporting plate,
 (b) means for mounting said plate on a fishing rod,
 (c) a fishing reel seated on said supporting plate,
 (d) a line spool embodied in said reel having a line wound thereon and leading therefrom,
 (e) a base plate embodied in said mounting means, and
 (f) a line anchoring stud immovably fixed on said base plate adapted to hold a line leading from said spool and passed therearound,
 (g) said stud having an outer end spaced from said base plate a distance approximating the thickness of the line engaged by said stud,
 (h) the outer end of said stud constituting a seat adapted to receive the thumb of an operator.
4. In a fishing reel and mount therefor,
 (a) a reel supporting plate,
 (b) means for mounting said plate on a fishing rod,
 (c) a fishing reel seated on said supporting plate,
 (d) a line spool embodied in said reel having a line wound thereon and leading therefrom,
 (e) a base plate embodied in said mounting means,
 (f) a line anchoring stud immovably fixed on said base plate adapted to hold a line leading from said spool and passed therearound,
 (g) said stud having an outer end spaced from said base plate a distance approximating the thickness of the line engaged by said stud,
 (h) the outer end of said stud constituting a seat adapted to receive the thumb of an operator, and
 (i) a line engaging bridge on said base plate adjacent said stud having an outer margin arranged to support a line passed around said stud in outwardly spaced relation to the outer end of the stud.

5. In a fishing reel mount, a clamp mountable on a fishing rod, means on said clamp for supporting a line spool, a line anchoring stud immovably fixed on said clamp for engagement by a line leading from a spool supported on said clamp, and a bridge on said clamp adjacent said stud projecting outwardly therefrom slightly beyond the outer end of said stud astride of which a line leading from said stud bears whereby a pull on said line in a direction away from said stud will elevate the line free of said stud.

6. In a fishing rod attachment, a pair of jaws, means for clamping said jaws in encompassing engagement with a finishing rod, a fishing reel mounted on one of said jaws, a line spool embodied in said reel, a line anchoring stud fixed on the other of said jaws for engagement by a line leading from said spool, and means on said last named jaw for elevating the line free of said stud on a pull being imparted to the line in a direction away from said stud.

7. In a fishing rod attachment, a line anchoring element comprising a base plate, a fixed stud projecting from said plate around which a line to be anchored may be looped, said stud having a height slightly more than the thickness of a line to be engaged thereby, a bridge projecting from said plate adjacent said stud having a margin spaced slightly outward relative to the outer end of said stud and over which a line looped around said stud is passed, said bridge acting to elevate the portion of the line engaged by the stud on a pull being imparted to the line from the side of the bridge opposite said stud, and means for attaching said plate to a fishing rod.

References Cited by the Examiner

UNITED STATES PATENTS

| | | | |
|---|---|---|---|
| 842,761 | 1/07 | Buckwalter | 242—84.2 |
| 1,416,386 | 5/22 | Selah | 24—279 |
| 1,617,543 | 2/27 | Roberts | 242—84.2 |
| 2,083,689 | 6/37 | Clifford | 242—84.2 |
| 2,389,515 | 11/45 | King | 242—84.44 |
| 2,519,257 | 8/50 | Legner | 43—25 |
| 2,574,007 | 11/51 | Anderson | 248—230 X |
| 2,761,237 | 9/56 | Piaja | 43—25 |
| 2,843,963 | 7/58 | Butehorn | 43—25 |
| 2,886,276 | 5/59 | Epperson | 248—183 |
| 3,053,004 | 9/62 | Baker | 43—25 |
| 3,053,469 | 9/62 | King | 242—84.2 |

FOREIGN PATENTS

| | | |
|---|---|---|
| 1,176,849 | 11/58 | France. |
| 361,601 | 11/31 | Great Britain. |

MERVIN STEIN, *Primary Examiner.*

JOSEPH P. STRIZAK, *Examiner.*